United States Patent
Katou

(10) Patent No.: US 9,152,491 B2
(45) Date of Patent: Oct. 6, 2015

(54) JOB CONTINUATION MANAGEMENT APPARATUS, JOB CONTINUATION MANAGEMENT METHOD AND JOB CONTINUATION MANAGEMENT PROGRAM

(71) Applicant: NEC Corporation, Minato-ku, Tokyo (JP)

(72) Inventor: Haruki Katou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 252 days.

(21) Appl. No.: 13/764,371

(22) Filed: Feb. 11, 2013

(65) Prior Publication Data
US 2013/0219224 A1   Aug. 22, 2013

(30) Foreign Application Priority Data
Feb. 17, 2012   (JP) ................. 2012-032771

(51) Int. Cl.
| G06F 11/00 | (2006.01) |
| G06F 11/07 | (2006.01) |
| G06F 9/46 | (2006.01) |
| G06F 11/14 | (2006.01) |
| G06F 11/20 | (2006.01) |

(52) U.S. Cl.
CPC .............. *G06F 11/079* (2013.01); *G06F 9/46* (2013.01); *G06F 11/1484* (2013.01); *G06F 11/202* (2013.01)

(58) Field of Classification Search
CPC ...................................................... G06G 9/46
See application file for complete search history.

(56) References Cited

U.S. PATENT DOCUMENTS

| 4,521,847 | A  | * | 6/1985  | Ziehm et al. ................ 700/79 |
| 4,674,038 | A  | * | 6/1987  | Brelsford et al. ............. 714/15 |
| 4,947,397 | A  | * | 8/1990  | Sobel et al. .................. 714/45 |
| 5,245,368 | A  | * | 9/1993  | Farrell et al. ............... 358/401 |
| 5,805,790 | A  | * | 9/1998  | Nota et al. .................. 714/10 |
| 6,223,009 | B1 | * | 4/2001  | Niitsuma .................... 399/82 |
| 6,600,569 | B1 | * | 7/2003  | Osada et al. .............. 358/1.12 |
| 6,625,752 | B1 | * | 9/2003  | Kader et al. ................. 714/11 |
| 6,661,527 | B1 | * | 12/2003 | Shibao .................... 358/1.13 |
| 6,718,486 | B1 | * | 4/2004  | Roselli et al. ................ 714/41 |
| 6,775,729 | B1 | * | 8/2004  | Matsuo et al. .............. 710/263 |
| 7,613,742 | B2 | * | 11/2009 | Bohannon et al. ............. 1/1 |
| 8,195,739 | B2 | * | 6/2012  | Bernardin et al. .......... 709/203 |

(Continued)

FOREIGN PATENT DOCUMENTS

| JP | H08314875 A | 11/1996 |
| JP | H09288590 A | 11/1997 |

*Primary Examiner* — Amine Riad
(74) *Attorney, Agent, or Firm* — Sughrue Mion, PLLC

(57) ABSTRACT

A job continuation management apparatus according to an exemplary aspect of the invention includes, job execution units that carrying out jobs; a job management information memory unit storing job identification information, identification information on the job execution unit, job execution information and job continuing execution priority in unit of the job; and a job continuation management unit referring to the job management information memory unit when a failure occurs in the job execution units, and, about records having identification information of the job execution unit identical with identification information of the failed job execution, sends the job identification information and the job execution information to one of the job execution units except for the failed unit sequentially in a order starting from a job having highest the job continuing execution priority to lowest, and making the job execution unit of a receiving party perform continuation execution of the job.

7 Claims, 9 Drawing Sheets

241 JOB MANAGEMENT INFORMATION

| JOB NAME | JOB EXECUTION SERVER | JOB EXECUTION INFORMATION | | | CONTINUATION PRIORITY | EXCEPTIONAL TIMING | EXCEPTIONAL TIMING CONTINUATION PRIORITY |
|---|---|---|---|---|---|---|---|
| | | JOB PROCESSING ENGINE | RESULT NOTIFICATION DESTINATION | INPUT DATA BEING IN PROCESS | | | |
| JOB 1 | SERVER 1 | addition | CLIENT | NUM1(I),NUM2(I),I=5 | 4 | END OF MONTH | 2 |
| JOB 2 | SERVER 1 | multiplication | CLIENT | NUM1(I),NUM2(I),I=3 | 5 | END OF PERIOD | 0 |
| JOB 3 | SERVER 2 | subtraction | CLIENT | NUM1(I),NUM2(I),I=4 | 4 | END OF MONTH | 3 |
| JOB 4 | SERVER 2 | division | CLIENT | NUM1(I),NUM2(I),I=2 | 5 | END OF PERIOD | 1 |

(56) References Cited

U.S. PATENT DOCUMENTS

| | | | |
|---|---|---|---|
| 8,209,419 B2* | 6/2012 | Ellis et al. | 709/227 |
| 8,417,762 B2* | 4/2013 | Branson et al. | 709/201 |
| 8,635,493 B2* | 1/2014 | Ziskind et al. | 714/13 |
| 2001/0022662 A1* | 9/2001 | Hosoda | 358/1.9 |
| 2002/0159092 A1* | 10/2002 | Christodoulou et al. | 358/1.15 |
| 2005/0065836 A1* | 3/2005 | Tanaka et al. | 705/9 |
| 2006/0195508 A1* | 8/2006 | Bernardin et al. | 709/203 |
| 2009/0185212 A1* | 7/2009 | Gustafson et al. | 358/1.15 |
| 2009/0249043 A1* | 10/2009 | Sato | 712/226 |
| 2009/0257086 A1* | 10/2009 | Takeuchi | 358/1.15 |
| 2010/0287553 A1* | 11/2010 | Schmidt et al. | 718/101 |
| 2012/0304181 A1* | 11/2012 | Jensen et al. | 718/102 |
| 2012/0311376 A1* | 12/2012 | Taranov et al. | 714/4.11 |
| 2012/0311377 A1* | 12/2012 | Blood et al. | 714/4.12 |
| 2012/0327448 A1* | 12/2012 | Furuwata et al. | 358/1.13 |
| 2014/0078548 A1* | 3/2014 | Kikuchi | 358/1.15 |
| 2014/0122920 A1* | 5/2014 | Ziskind et al. | 714/4.11 |

* cited by examiner

Fig.3

141 JOB MANAGEMENT INFORMATION

| JOB NAME | JOB EXECUTION INFORMATION | | | | CONTINUATION PRIORITY |
|---|---|---|---|---|---|
| | JOB EXECUTION SERVER | JOB PROCESSING ENGINE | RESULT NOTIFICATION DESTINATION | INPUT DATA BEING IN PROCESS | |
| JOB 1 | SERVER 1 | addition | CLIENT | NUM1(I),NUM2(I),I=5 | 1 |
| JOB 2 | SERVER 1 | multiplication | CLIENT | NUM1(I),NUM2(I),I=3 | 3 |
| JOB 3 | SERVER 2 | subtraction | CLIENT | NUM1(I),NUM2(I),I=4 | 2 |
| JOB 4 | SERVER 2 | division | CLIENT | NUM1(I),NUM2(I),I=2 | 4 |

142 MACHINE MANAGEMENT INFORMATION

| SERVER NAME | IP ADDRESS | MAXIMUM NUMBER OF SIMULTANEOUSLY EXECUTED JOBS |
|---|---|---|
| HOST SERVER | 192.168.0.10 | — |
| SERVER 1 | 192.168.0.101 | 2 |
| SERVER 2 | 192.168.0.102 | 2 |
| SERVER 3 | 192.168.0.103 | 1 |
| CLIENT | 192.168.0.200 | — |

Fig.7

241 JOB MANAGEMENT INFORMATION

| JOB NAME | JOB EXECUTION SERVER | JOB EXECUTION INFORMATION | | | CONTINUATION PRIORITY | EXCEPTIONAL TIMING | EXCEPTIONAL TIMING CONTINUATION PRIORITY |
|---|---|---|---|---|---|---|---|
| | | JOB PROCESSING ENGINE | RESULT NOTIFICATION DESTINATION | INPUT DATA BEING IN PROCESS | | | |
| JOB 1 | SERVER 1 | addition | CLIENT | NUM1(I),NUM2(I),I=5 | 4 | END OF MONTH | 2 |
| JOB 2 | SERVER 1 | multiplication | CLIENT | NUM1(I),NUM2(I),I=3 | 5 | END OF PERIOD | 0 |
| JOB 3 | SERVER 2 | subtraction | CLIENT | NUM1(I),NUM2(I),I=4 | 4 | END OF MONTH | 3 |
| JOB 4 | SERVER 2 | division | CLIENT | NUM1(I),NUM2(I),I=2 | 5 | END OF PERIOD | 1 |

JOB CONTINUATION MANAGEMENT APPARATUS, JOB CONTINUATION MANAGEMENT METHOD AND JOB CONTINUATION MANAGEMENT PROGRAM

This application is based upon and claims the benefit of priority from Japanese Patent Application No. 2012-032771, filed on Feb. 17, 2012, the disclosure of which is incorporated herein in its entirety by reference.

TECHNICAL FIELD

The present invention relates to a job continuation management apparatus, a job continuation management method and a job continuation management program that efficiently perform continuing execution of jobs which have been being carried out at the time of a system failure.

BACKGROUND ART

In the modern society in which IT environments have been developed highly and the dependence to IT in daily life is increasing, influence of a failure of a computer system on the society is very large, and thus a demand for high availability of a computer system is increasing more and more. In such a high availability system, it is one of big challenges how efficiently to perform recovery when failures occur.

As one of methods for establishing a highly available system, a method by which a spare server is prepared in advance as a server of a standby system in addition to servers of an active system used in a usual operation, and, when a failure occurs in the active-system server, the system is continued by switching to the server of a standby system, for example. Also, in recent years, according to the advance of a capacity increase and a price reduction of a hard disk and a memory, and to the progress of virtualization technologies which divide one server into a plurality of servers virtually, it has become possible to build virtual servers of an active system and a virtual server of a standby system in a single server. Thus, technological environments that enable construction of a highly available system relatively cheaply are also being put into place.

As an example of a high availability system utilizing such virtualization technology, in Japanese Patent Application Laid-Open No. 1997-288590, there is disclosed a system for realizing a non-stop operation of a system by making one of child OSs generated by a virtual computer system exist as a standby system, and by making, when a child OS of an active system becomes incapable of performing processing any more due to a system malfunction, the child OS of the standby system take the processing over.

Also, as another example of a system to perform recovery processing at the time of failure occurrence efficiently, in Japanese Patent Application Laid-Open No. 1996-314875, there is disclosed a system in which, when a failure occurs in a distributed node in a distributed system, lost function substitution about an application task to be lost by the failure is performed between normal distributed nodes according to the priority of the node for determining a party who takes over the task.

SUMMARY

In the technology disclosed in Japanese Patent Application Laid-Open No. 1997-288590 mentioned above, all pieces of processing having been being carried out by a child OS of an active system or by a distribution node in which a failure has occurred are taken over simultaneously by a child OS of a standby system or by a normal distributed node. Accordingly, there is a problem that it takes time to perform recovery because restart at a party which takes over the pieces of processing having been being carried out in the failure occurrence origin are performed after all data about the execution environment of the failure occurrence origin has been handed to the taking-over party.

The technology disclosed in Japanese Patent Application Laid-Open No. 1996-314875 is a technology in which an application task whose execution has been stopped by a failure is taken over according to priority for determining which node should take over it, but not according to the processing priority of the application task itself. Accordingly, there is a problem that it is not necessarily the case that continuation execution of an application task having high processing priority essentially is performed first.

An object of the present invention is to provide a job continuation management apparatus, a job continuation management system, a job continuation management method and a job continuation management program which settle these problems.

A job continuation management apparatus according to an exemplary aspect of the invention includes, a plurality of job execution units that carry out jobs; a job management information memory unit that stores job identification information, identification information on the job execution unit that is an executor, job execution information and job continuing execution priority in unit of the job in a correlating manner; and a job continuation management unit that refers to the job management information memory unit when a failure occurs in one of the job execution units, and, about records having identification information of the job execution unit identical with identification information of the job execution unit of failure origin, sends the job identification information and the job execution information to one of the job execution units except for a job execution unit of the failure origin sequentially in a order starting from a job having highest the job continuing execution priority to lowest, and making the job execution unit of a receiving party perform continuation execution of the job.

A job continuation management method according to an exemplary aspect of the invention includes, carrying out jobs by a plurality of job execution units; storing job identification information, identification information on the job execution unit that is an executor, job execution information and job continuing execution priority in unit of the job in a correlating manner in a memory area; and referring to the memory area when a failure occurs in one of the job execution units, and, about records having identification information of the job execution unit identical with identification information of the job execution unit of failure origin, sending the job identification information and the job execution information to one of the job execution units except for a job execution unit of the failure origin sequentially in a order starting from a job having highest the job continuing execution priority to lowest, and making the job execution unit of a receiving party perform continuation execution of the job.

A computer-readable recording medium according to an exemplary aspect of the invention records thereon a program which makes a computer having a plurality of job execution units that carry out jobs and a memory area function as a job management information memory unit that stores job identification information, identification information on the job execution unit that is an executor, job execution information and job continuing execution priority in unit of the job in a correlating manner; and a job continuation management unit that refers to the job management information memory unit when a failure occurs in one of the job execution units, and, about records having identification information of the job execution unit identical with identification information of the job execution unit of failure origin, sends the job identification information and the job execution information to one of the job execution units except for a job execution unit of the failure origin sequentially in a order starting from a job having highest the job continuing execution priority to lowest, and making the job execution unit of a receiving party perform continuation execution of the job.

BRIEF DESCRIPTION OF THE DRAWINGS

Exemplary features and advantages of the present invention will become apparent from the following detailed description when taken with the accompanying drawings in which:

FIG. 3 is an exemplary configuration of job management information in the first exemplary embodiment of the present invention;

FIG. 7 is an exemplary configuration of job management information in the second exemplary embodiment of the present invention.

EXEMPLARY EMBODIMENT

The first exemplary embodiment of the present invention will be described in detail with reference to a drawing.

Figure 1:
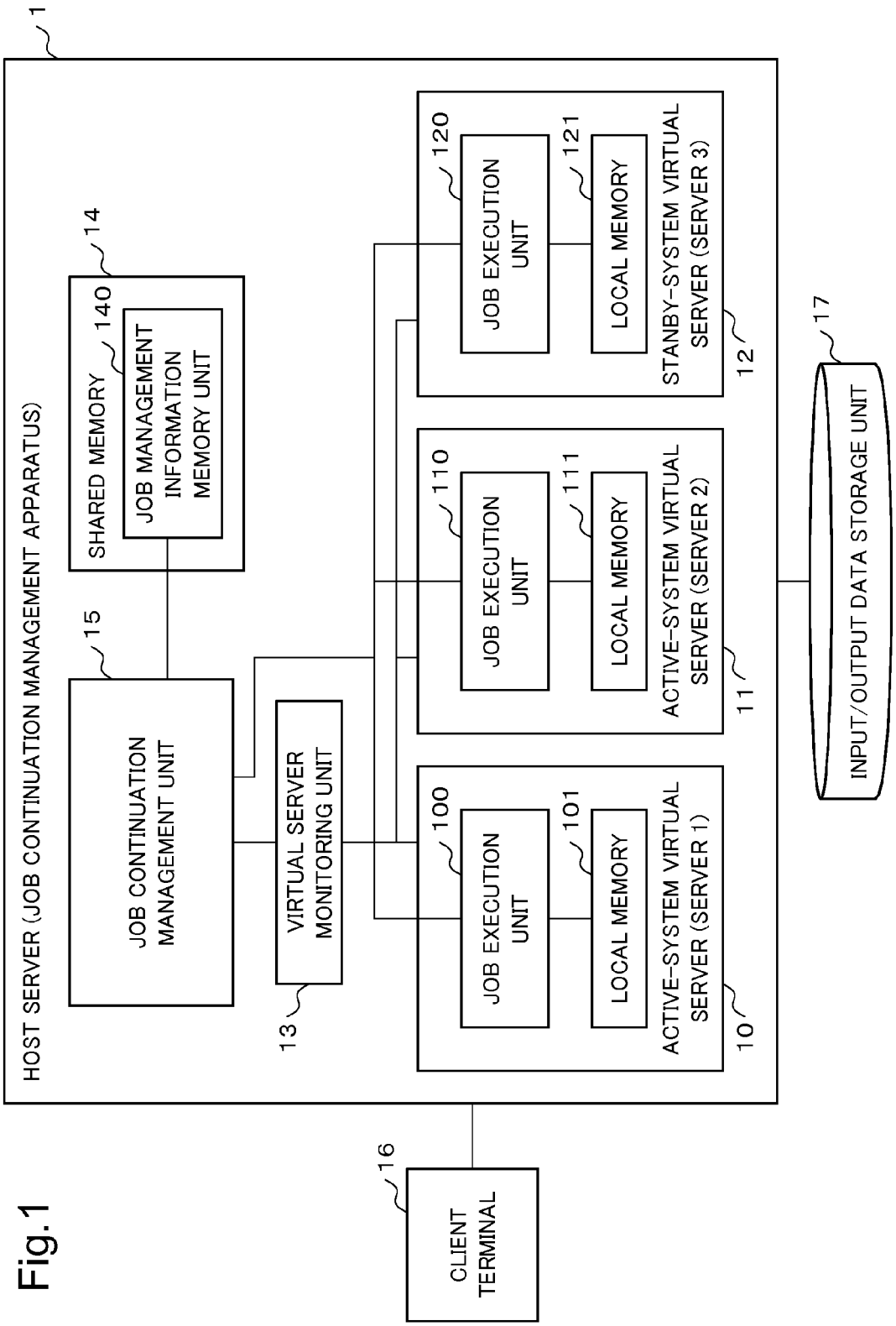
FIG. 1 is a block diagram showing a configuration of a first exemplary embodiment of the present invention.

FIG. 1 is a block diagram showing a configuration of this exemplary embodiment.

A job continuation management system of this exemplary embodiment includes a host server 1, a client terminal 16 and an input/output data storage unit 17.

The host server 1 configures a virtual server system and includes active-system virtual servers 10 and 11, a standby-system virtual server 12, a virtual server monitoring unit 13, a shared memory 14 and a job continuation management unit 15.

The active-system virtual servers 10 and 11 are virtual servers built by the host server 1, and the names of server 1 and server 2 are given by the host server 1, respectively. The active-system virtual servers 10 and 11 are virtual servers which carry out jobs at a time of a usual operation, and include a job execution units 100 and 110, and local memories 101 and 111, respectively. The local memories 101 and 111 store programs and data of jobs which the job execution units 100 and 110 execute, respectively.

Similarly, the standby-system virtual server 12 is a virtual server built by the host server 1, and the name of server 3 is given by the host server 1. The standby-system virtual server 12 does not carry out jobs at a time of an usually operation, and, when a failure occurs in any one of the active-system virtual servers 10 and 11, and jobs cannot be carried out any more by the failed server, takes the jobs over from the failed server and continues execution of the stopped jobs. The standby-system virtual server 12 includes a job execution unit 120 and a local memory 121. The local memory 121 stores programs and data of jobs which the job execution unit 120 executes.

The virtual server monitoring unit 13 monitors occurrence of a failure in the active-system virtual servers 10 and 11, and, when a failure occurs in any one of the virtual servers, receives a failure message from a virtual server in which a failure has occurred and transmits the server name of that server to the job continuation management unit 15.

The shared memory 14 is a memory which is being managed by the host server 1 directly, and it is also accessible from the active-system virtual servers 10 and 11 and the standby-system virtual server 12. The shared memory 14 stores a copy of the programs and data of jobs executed by the active-system virtual servers 10 and 11 and the standby-system virtual server 12.

The shared memory 14 includes a job management information memory unit 140. The job management information memory unit 140 stores job management information 141 which is management information about each job being carried out by the active-system virtual servers 10 and 11.

An exemplary configuration of the job management information 141 is shown in FIG. 3. The job management information 141 correlates a job name, a job execution server, a job processing engine, a result notification destination, input data being in process and continuation priority. "Job name" is given by the host server 1 uniquely in order to distinguish all jobs carried out in the host server 1. "Job execution server" indicates a server that is carrying out a job concerned, and for example, it is shown that job 1 and job 2 are being carried out by the active-system virtual server 10 (server 1), and that job 3 and job 4 are being carried out by the active-system virtual server 11 (server 2). "Job processing engine" indicates the name of a program executed by a job, and for example, it is shown that job 1 executes the program for addition (addition of pieces of input data) and job 2 executes the program for multiplication (multiplication of pieces of input data). "Result notification destination" indicates the output destination of a job execution result, and it is shown that, in this exemplary configuration, jobs 1 to 4 perform output to the client terminal 16. "Input data being in process" indicates input data which a job is processing at present, and for example, it is shown that job 1 is processing input data NUM1 (5) and NUM2 (5), and job 2 NUM1 (3) and NUM2 (3). "Continuation priority" indicates execution priority when execution of a job is continued at the time of failure occurrence, the priority being set by the host server 1. The smaller its numerical value is, the higher its priority is. Accordingly, in this exemplary configuration, it is shown that job 1 has the highest priority, followed by job 3, job 2 and job 4 in this order.

The shared memory 14 also stores machine management information 142 which is management information on the system.

Figure 4:
FIG. 4 is an exemplary configuration of machine management information in the first exemplary embodiment of the present invention.

An exemplary configuration of the machine management information 142 is shown in FIG. 4. The machine management information 142 correlates a server name, an IP address and a maximum number of simultaneously executed jobs. "IP address" is an IP address of each server or a client terminal given by a system administrator of this exemplary embodiment. "The maximum number of simultaneously executed jobs" indicates the maximum number of jobs which each of the active-system virtual servers 10 (server 1) and 11 (server 2) and the standby-system virtual server 12 (server 3) can carry out simultaneously, and it is shown that the maximum number of jobs of the active-system virtual servers 10 and 11 is 2 and the maximum number of jobs of the standby-system virtual server 12 is 1. The reason why the maximum number of jobs of the standby-system virtual server 12 is small compared with the maximum number of jobs of the active-system virtual servers 10 and 11 is that, because an system administrator makes a hardware resource to be assigned to the standby-system virtual server 12 that is not used at usual operation times small for effective use of hardware resources.

When a failure occurs in any of the active-system virtual servers 10 and 11, the job continuation management unit 15 makes the standby-system virtual server 12 take jobs which have been being carried out by the virtual server in which the failure has occurred over and carry them out.

For example, when a failure occurs in the active-system virtual server 10 (server 1), the virtual server monitoring unit 13 receives failure occurrence information sent from the active-system virtual server 10, and informs the job continuation management unit 15 that the failure has occurred in the active-system virtual server 10.

The job continuation management unit 15 receives the information of failure occurrence, searches for a record in which a job execution server is server 1 from the job management information 141 in the job management information memory unit 140, and, as a result, extracts the records about job 1 and job 2 having been being carried out by server 1.

Because the number of jobs that the standby-system virtual server 12 is carrying out at the present moment is 0 according to the job management information 141, and the maximum number of simultaneously executed jobs of the standby-system virtual server 12 is 1 according to the machine management information 142, the job continuation management unit 15 confirms that the standby-system virtual server 12 is in a state that job execution is possible.

The job continuation management unit 15 compares the continuation priority of the records about job 1 and job 2 extracted in the above, and transmits information on the job name, the job processing engine, the result notification destination and the input data being in process in the record of job 1 having high continuation priority to the job execution unit 120 of the standby-system virtual server 12 and directs continuing execution of job 1. Simultaneously, the job continuation management unit 15 rewrites data of the job execution server of the record of job 1 in the job management information 141 from server 1 to server 3.

Upon receiving an instruction of continuing execution of job 1 from the job continuation management unit 15, the job execution unit 120 of the standby-system virtual server 12 loads the program of the job processing engine "addition" and the input data NUM1 (I) and NUM2 (I) into the local memory 121 from the shared memory 14, and begins continuing execution of the job starting from I=5.

In succession to job 1, the job continuation management unit 15 performs, about job 2, too, preparation for directing the job execution unit 120 of the standby-system virtual server 12 to perform job continuing execution. At a time point when continuing execution of job 1 in the standby-system virtual server 12 has not completed yet, the number of jobs that the standby-system virtual server 12 is executing is 1. In addition, according to the machine management information 142, the maximum number of simultaneously executed jobs of the standby-system virtual server 12 is 1. Accordingly, the job continuation management unit 15 confirms that it is a state that the standby-system virtual server 12 cannot be made to perform additional execution of a job. In this case, the job continuation management unit 15 suspends an instruction of continuing execution of job 2 to the standby-system virtual server 12 until continuing execution of job 1 in the standby-system virtual server 12 is completed.

When the continuing execution of job 1 is completed, the job execution unit 120 reports the execution completion of job 1 to the job continuation management unit 15. Upon receiving the execution completion report of job 1, the job continuation management unit 15 eliminates the record of job 1 in the job management information 141. At this time point, the number of jobs in the job management information 141 that the standby-system virtual server 12 is carrying out becomes 0. Accordingly, the job continuation management unit 15 confirms that the standby-system virtual server 12 is in a state that job execution is possible, and outputs the instruction of continuing execution of job 2 for the standby-system virtual server 12 that has been suspended to the job execution unit 120. Simultaneously, the job continuation management unit 15 rewrites the data of the job execution server of the record of job 2 in the job management information 141 from server 1 to server 3.

Upon receiving the instruction of continuing execution of job 2 from the job continuation management unit 15, the job execution unit 120 loads the program of the job processing engine "multiplication" and the input data NUM1 (I) and NUM2 (I) into the local memory 121 from the shared memory 14, and begins continuing execution of the job starting from I=3.

At this time point, there is no job for which continuation execution has not started yet among the jobs which have been being carried out by the active-system virtual server 10, and thus the host server 1 makes the standby-system virtual server 12 be promoted to an active-system virtual server.

The client terminal 16 is a terminal by which a user of a system of this exemplary embodiment directs job execution, and checks an execution result of jobs.

The input/output data storage unit 17 is a disk apparatus for storing programs and input data used by jobs carried out by a system of this exemplary embodiment, or output data of an execution result of jobs.

Figure 2A:
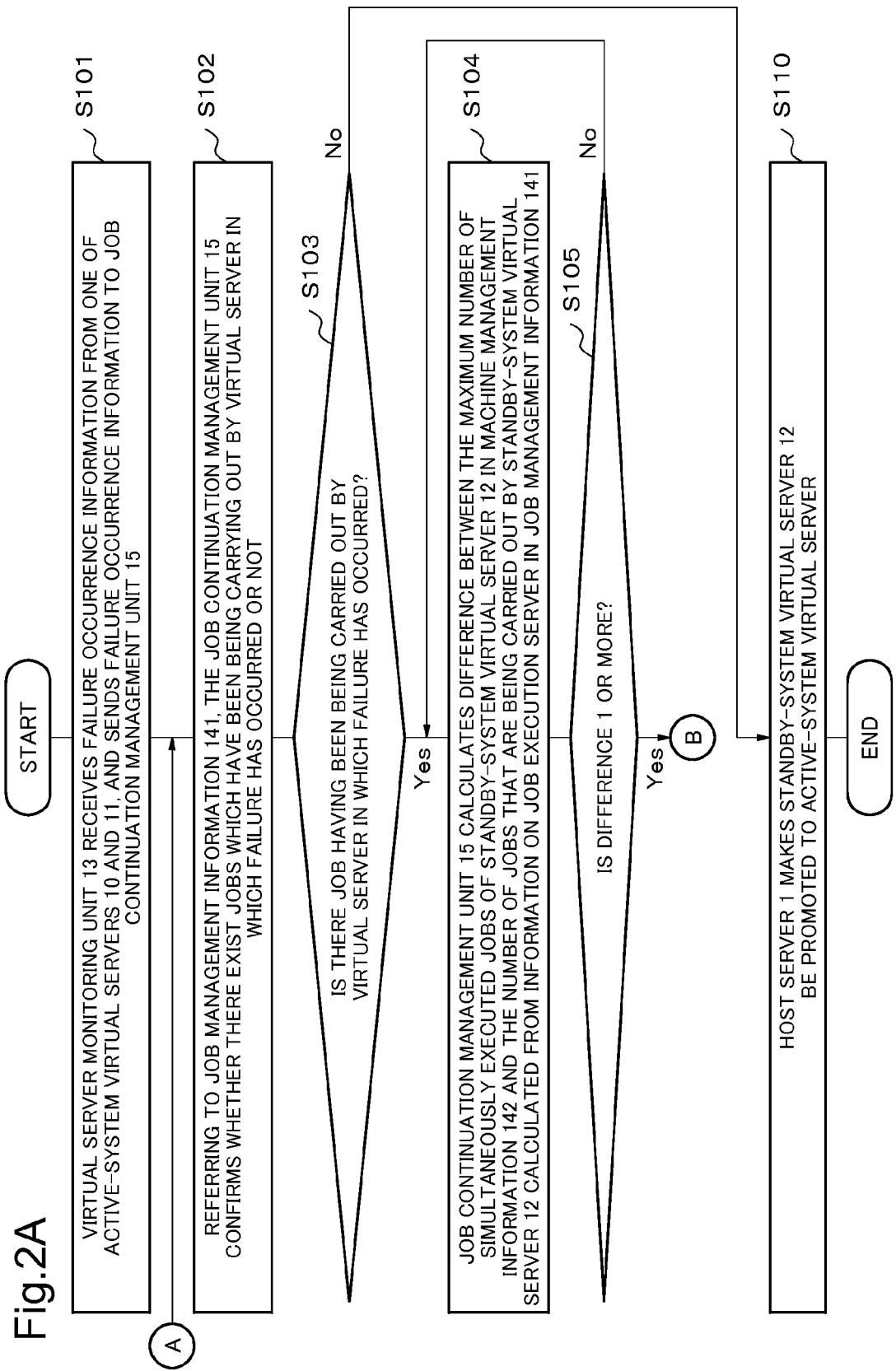
FIG. 2A is a flow chart (1/2) showing operations of the first exemplary embodiment of the present invention.
Figure 2B:
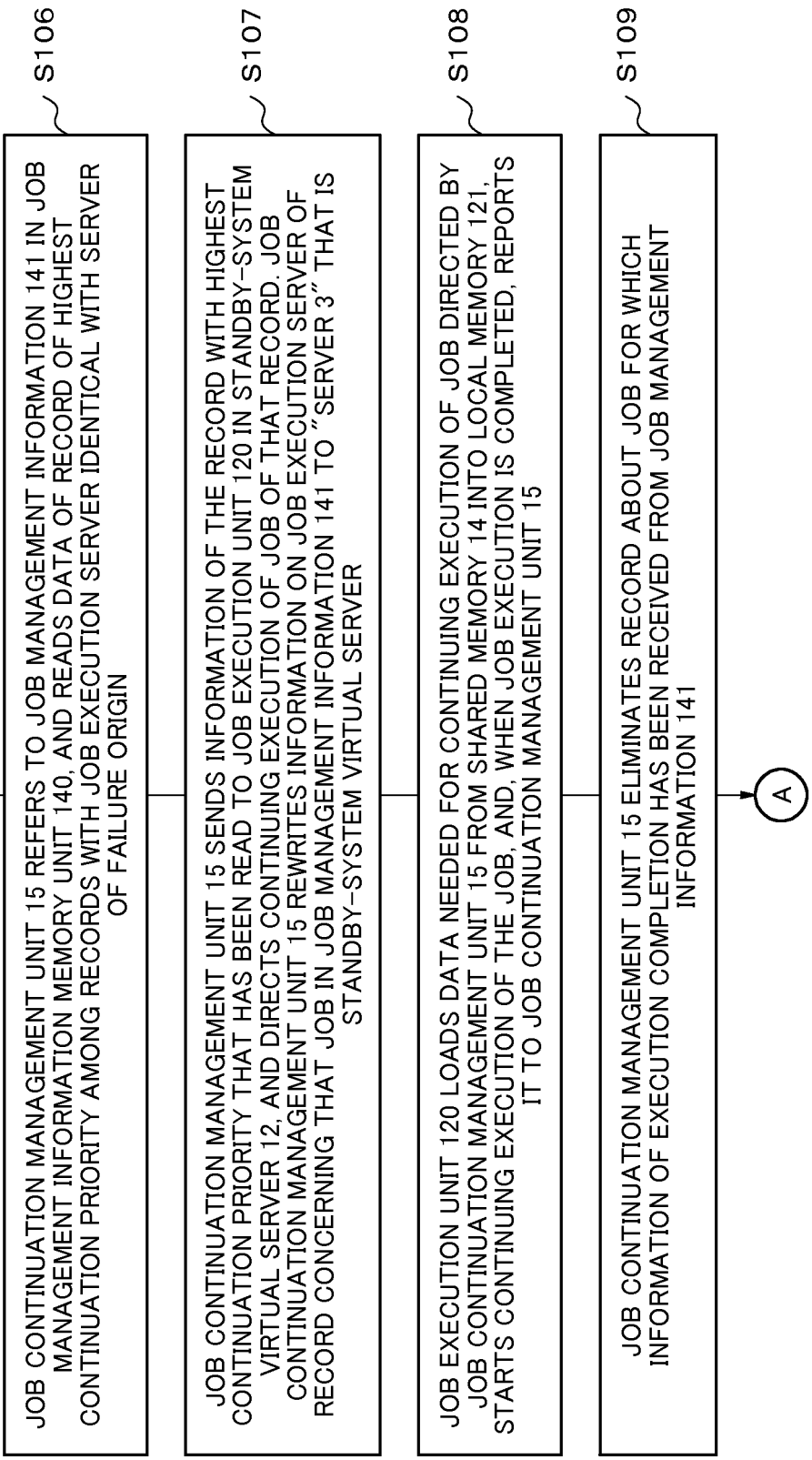
FIG. 2B is a flow chart (2/2) showing operations of the first exemplary embodiment of the present invention.

Next, referring to the flow charts of FIGS. 2A to 2B, operations of this exemplary embodiment will be described in detail.

The virtual server monitoring unit 13 receives failure occurrence information from one of the active-system virtual servers 10 and 11, and sends the failure occurrence information to the job continuation management unit 15 (S101). Referring to the job management information 141, the job continuation management unit 15 confirms whether there exist jobs which have been being carrying out by a virtual server in which a failure has occurred or not (S102). When there is no job which has been being carried out by the virtual server in which the failure has occurred (in S103, No), the host server 1 makes the standby-system virtual server 12 be promoted to an active-system virtual server (S110), and finishes the whole processing.

When there are jobs which have been being carried out by the virtual server in which the failure has occurred (in S103, Yes), the job continuation management unit 15 calculates a difference between the maximum number of simultaneously executed jobs of the standby-system virtual server 12 in the machine management information 142 and the number of jobs that are being carried out by the standby-system virtual server 12 calculated from information on a job execution server in the job management information 141 (S104). When the difference is not 1 or more (in S105, No), the job continuation management unit 15 stands by in this state.

When the difference is 1 or more (in S105, Yes), the job continuation management unit 15 refers to the job management information 141 in the job management information memory unit 140, and reads the data of a record of the highest continuation priority among records with a job execution server identical with the server of the failure origin (S106). The job continuation management unit 15 sends information of the record with the highest continuation priority that has been read to the job execution unit 120 in the standby-system virtual server 12, and directs continuing execution of the job of that record. Then, the job continuation management unit 15 rewrites information on a job execution server of the record concerning the job in the job management information 141 to "server 3" that is a standby-system virtual server (S107).

The job execution unit 120 loads data needed for continuing execution of the job directed by the job continuation management unit 15 from the shared memory 14 into the local memory 121, starts continuing execution of the job, and, when job execution is completed, reports it to the job continuation management unit 15 (S108). The job continuation management unit 15 eliminates the record about the job for which information of execution completion has been received from the job management information 141, and the processing returns to S102 (S 109).

This exemplary embodiment has an effect that continuing execution of a job, execution of which has been stopped by occurrence of a system failure, is begun efficiently in a small amount of time. The first reason is that, according to information of job continuation priority stored in the job management information memory unit 140, the job continuation management unit 15 delivers information required for continuing execution of jobs to the standby-system virtual server 12 successively in the order of continuation priority of a job from highest to lowest, and directs continuing execution of the jobs. At the time point when information required for continuing execution of a job of high priority has been able to obtain, the standby-system virtual server 12 can begin continuing execution of the job, and, compared with a method which begins continuing execution after information for continuing execution of all jobs which have been being carried out by a server of the failure origin has been obtained, continuing execution of the jobs can be begun in a small amount of time.

The second reason is that delivery of job continuing execution information to the standby-system virtual server 12 by the job continuation management unit 15 is performed by memory copy within the host server 1 configuring a virtual server system. Because, compared with a case in which delivery of job continuation information to a party that takes over a job is performed between different physical servers, a time needed for data transfer is short, continuing execution of a job can be begun in a small amount of time.

Although this exemplary embodiment has been described taking a system in which a job continuation management apparatus includes two active-system virtual servers and one standby-system virtual server as an example above, this exemplary embodiment is not limited to this structure. A virtual server may be an actual processor or the like. Also, an active-system server may be provided with a function of a standby system server at the same time.

Figure 5:
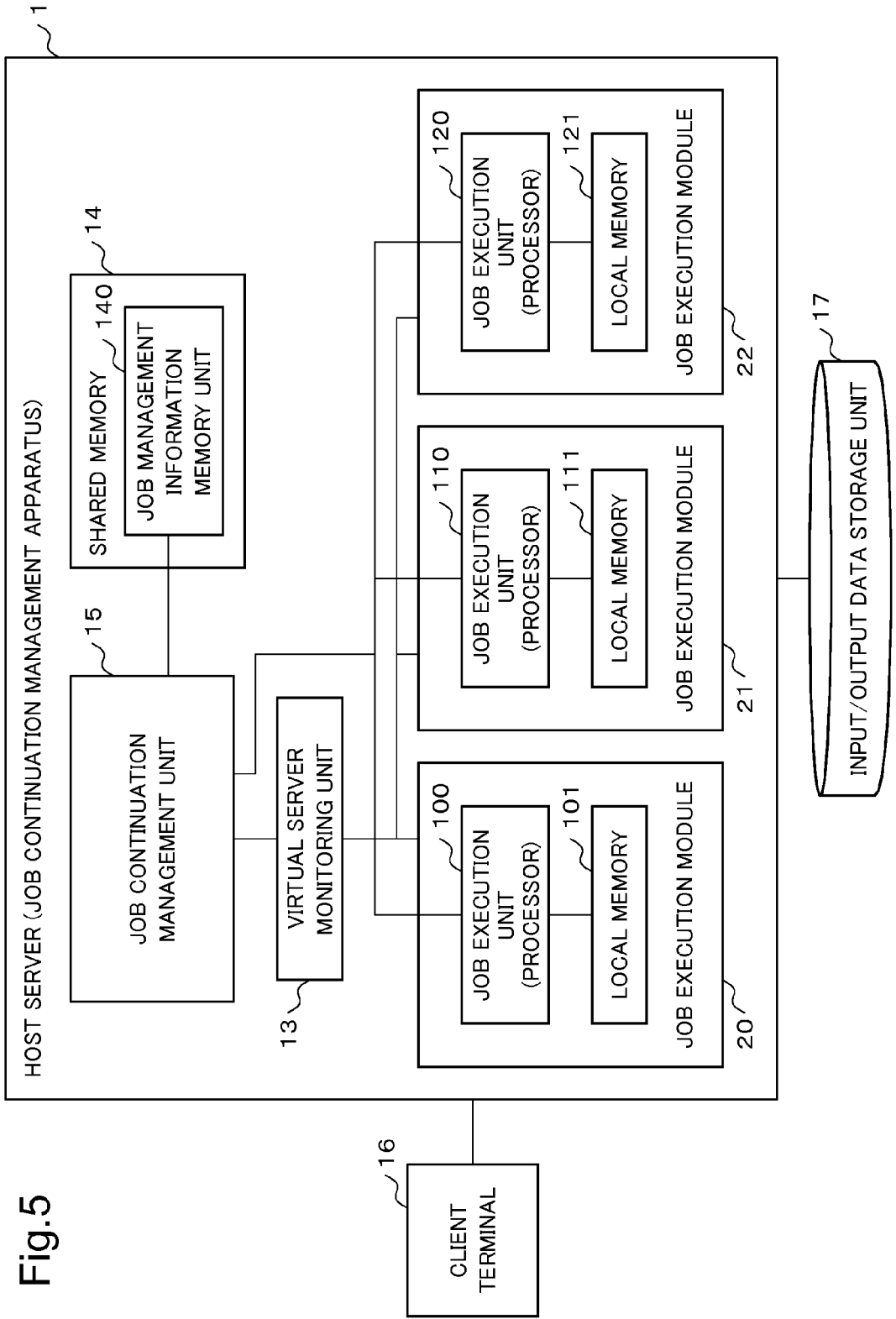
FIG. 5 is a block diagram showing a configuration of a variation of the first exemplary embodiment of the present invention.

A block diagram of a configuration of a variation of this exemplary embodiment is shown in FIG. 5. In this exemplary configuration, the job continuation management apparatus 1 includes job execution modules 20 to 22 instead of the active-system virtual servers 10 and 11 and the standby-system virtual server 12 in the above-mentioned exemplary configuration. The job execution modules 20 to 22 include the job execution units 100, 110, 120, and the local memories 101, 111 and 121, respectively. Each of the job execution units 100, 110, 120 is a single processor. The job execution modules 20 to 22 are active systems, and, at the same time, they have the function of a standby system, too. When a failure occurs in one of the job execution modules 20 to 22, two job execution units in which the failure has not occurred take stopped jobs over according to directions of the job continuation management unit 15.

<Second Exemplary Embodiment>

Next, the second exemplary embodiment of the present invention will be described in detail with reference to a drawing.

Figure 6:
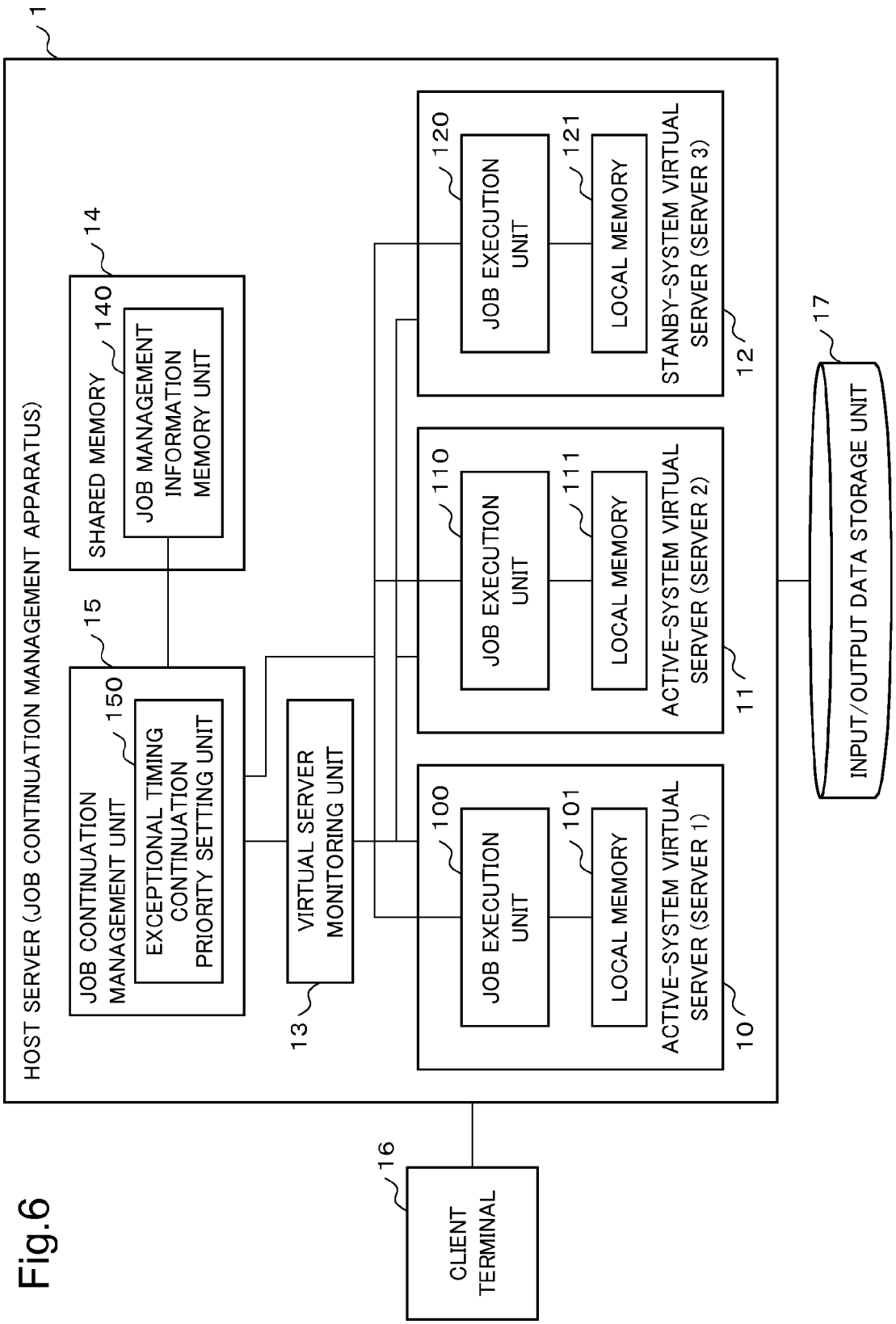
FIG. 6 is a block diagram showing a configuration of a second exemplary embodiment of the present invention.

FIG. 6 is a block diagram showing a structure of this exemplary embodiment.

Except that an exceptional timing continuation priority setting unit 150 is added into the job continuation management unit 15, the structure of a job continuation management system of this exemplary embodiment is similar to the structure of the first exemplary embodiment shown in FIG. 1.

In this exemplary embodiment, job management information 241 stored in the job management information memory unit 140 is different from the job management information 141 of the first exemplary embodiment. An exemplary configuration of the job management information 241 is shown in FIG. 7.

The job management information 241 further includes information on exceptional timing and exceptional timing continuation priority compared with the job management information 141 in the first exemplary embodiment. These are pieces of information in order for the job continuation management unit 15 to use, in a specific time indicated in "exceptional timing" such as the end of month and the end of a term, a numerical value indicated in "exceptional timing continuation priority" as continuation priority in a manner different from that of usual time.

The exceptional timing continuation priority setting unit 150 compares the current date and time information which the host server 1 holds and information on exceptional timing in the job management information 241. When there is a record in which the current date and time meets the time indicated in the field of exceptional timing, the exceptional timing continuation priority setting unit 150 directs, about the job of that record, the job continuation management unit 15 to change the numerical value of the continuation priority in the record to the numerical value of the exceptional timing continuation priority and perform an operation of job continuation.

For example, when a failure occurs in the active-system virtual server 10 (server 1) on the last day of May (the end of month), because the exceptional timing of job 1 is the end of month in the job management information 241, the exceptional timing continuation priority setting unit 150 directs the job continuation management unit 15 to change the numerical value of the continuation priority of job 1 from 4 to 2 and perform the operation of job continuation.

After the continuation priority of job 1 has been changed from 4 to 2, the job continuation management unit 15 performs the same operation as the first exemplary embodiment. In this case, the continuation priority of job 1 and job 2 will be 2 and 5, respectively, and the job continuation management unit 15 performs the job continuation operation in the order of job 1 and job 2.

When a failure occurs in the active-system virtual server 10 (server 1) on the last day of September (the end of a term), because the last day of September is also the end of month and it is also the end of a term, the continuation priority of job 1 and job 2 will be 2 and 0, respectively, and the job continuation management unit 15 performs the job continuation operation in the order of job 2 and job 1.

This exemplary embodiment has an effect that, when change of the setting of continuation priority of a job is desired limited to a certain specific time, change of the setting is performed automatically. The reason of this is that the exceptional timing continuation priority setting unit 150 refers to the time of exceptional timing indicated in the job management information 241 and a numerical value of exceptional timing continuation priority applied in that time, and, when it is the time of the exceptional timing, directs the job continuation management unit 15 to use the numerical value of exceptional timing continuation priority as continuation priority.

When setting change of priority is performed by hand about a job having high priority in a specific time such as the end of month and the end of a term although the priority in usual time is not so high, there can be a case where delay of processing of the highest priority job is caused due to omitted setting. In this exemplary embodiment, such problem is settled because the exceptional timing continuation priority setting unit 150 performs change of setting of the priority automatically.

<Third Exemplary Embodiment>

Next, the third exemplary embodiment of the present invention will be described in detail with reference to a drawing.

Figure 8:
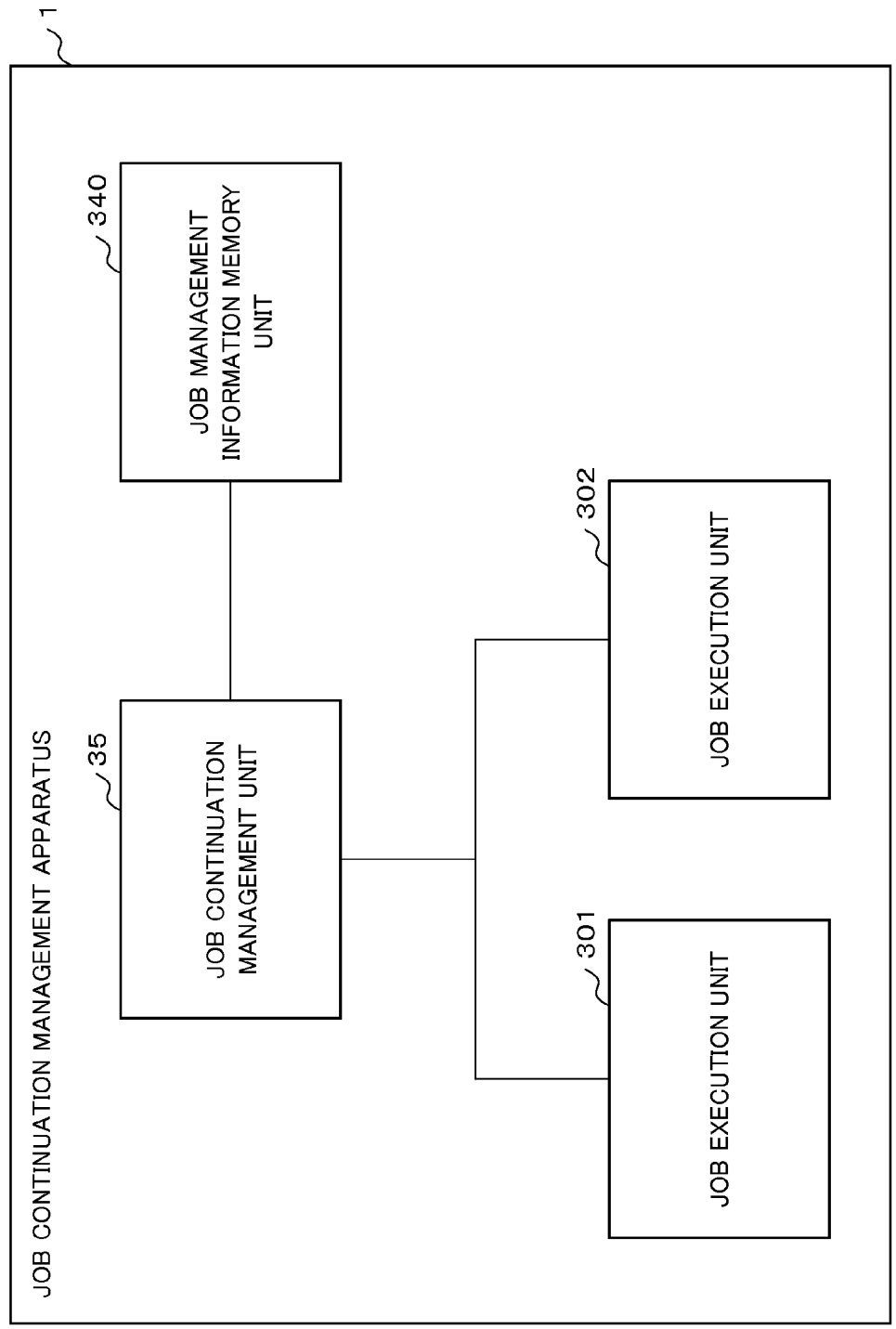
FIG. 8 is a block diagram showing a configuration of a third exemplary embodiment of the present invention.

FIG. 8 is a block diagram showing a structure of this exemplary embodiment.

The job continuation management apparatus 1 of this exemplary embodiment includes a plurality of, two, for example, job execution units 301 and 302, a job management information memory unit 340 and a job continuation management unit 35.

The job execution units 301 and 302 are equipment which carries out jobs. They may be usual processors, or may be virtual servers such as the active-system virtual servers 10 and 11 in the first exemplary embodiment.

About each job carried out by the job execution units 301 and 302, the job management information memory unit 340 stores identification information of the job, identification information of a job execution unit that executes the job, job execution information, and job continuing execution priority in a correlated manner. The detailed structure of this is similar to the job management information 141 of the first exemplary embodiment shown in FIG. 3.

Identification information of a job is a unique name given by a system management unit (not shown) in order to distinguish all jobs. Identification information of a job execution unit that executes a job will be the name of one of the job execution unit 301 and the job execution unit 302.

As shown in FIG. 3, job execution information includes a job processing engine, a result notification destination and input data being in process, and details of those are as described in the first exemplary embodiment. Job continuing execution priority indicates execution priority when performing continuation execution of a job at the time of failure occurrence set by the system management unit, and its details have been described in the first exemplary embodiment.

When a failure occurs in the job execution unit 301, for example, the job continuation management unit 35 refers to the job management information memory unit 340. Then, about records in which identification information of a job execution unit that executes jobs is the job execution unit 301, the job continuation management unit 35 sends, in the order of job continuing execution priority from highest to lowest, the identification information of a job concerned and the execution information of the job to the job execution unit 302 sequentially and makes the job execution unit 302 perform continuation execution of the job.

As is the case with the first exemplary embodiment, this exemplary embodiment has an effect that continuing execution of jobs whose execution have been stopped by occurrence of a failure in one of the job execution units 301 and 302 is begun in a short amount of time efficiently. The reason is that, according to information on job continuation priority stored in the job management information memory unit 340, the job continuation management unit 35 delivers information required for continuing execution of a job to a job execution unit of a party where the failure has not occurred successively from a job of the highest continuation priority to the lowest, and direct continuing execution of the job.

Although this exemplary embodiment is not equipped with a server of a standby system as is the case with the first and second exemplary embodiments, it realizes the above-mentioned effect.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. A job continuation management apparatus, comprising:
a plurality of job execution units that carry out jobs;
a job management information memory unit that stores job identification information, identification information on said job execution unit that executes said job, job execution information and job continuing execution priority for each said job in a correlating manner; and
a job continuation management unit that refers to said job management information memory unit when a failure occurs in one of said job execution units, and, about records having identification information of said job execution unit identical with identification information of said job execution unit of failure origin, sends said job identification information and said job execution information to one of said job execution units except for a job execution unit of said failure origin sequentially in an order starting from a job having highest said job continuing execution priority to lowest, and making said job execution unit of a receiving party perform continuation execution of said job;
wherein:
said job management information memory unit stores a specific time to carry out said job and exceptional timing continuing execution priority to be applied as said continuing execution priority of said job limited to said specific time in a correlating manner; and
when a record, with information of said specific time that matches current date and time information of a system, exists in said job management information memory unit, said job continuation management unit changes said continuation execution priority in said record to said exceptional timing continuing execution priority.

2. The job continuation management apparatus according to claim 1, wherein
said plurality of job execution units operate on a plurality of virtual servers built within one server having said job management information memory unit, and
said job continuation management unit sends said job identification information and said job execution information in said job management information memory unit to said job execution unit of a receiving party by memory copy within said server.

3. A job continuation management method, comprising:
carrying out jobs by a plurality of job execution units;
storing job identification information, identification information on said job execution unit that executes said job, job execution information and job continuing execution priority for each said job in a correlating manner in a memory area;
referring to said memory area when a failure occurs in one of said job execution units, and, about records having identification information of said job execution unit identical with identification information of said job execution unit of failure origin, sending said job identification information and said job execution information to one of said job execution units except for a job execution unit of said failure origin sequentially in an order starting from a job having highest said job continuing execution priority to lowest, and making said job execution unit of a receiving party perform continuation execution of said job;
storing a specific time to carry out said job and exceptional timing continuing execution priority to be applied as said continuing execution priority of said job limited to said specific time in a correlating manner in said memory area; and
when a record with information of said specific time that matches current date and time information of a system, exists in said memory area, changing said continuation execution priority in said record to said exceptional timing continuing execution priority.

4. The job continuation management method according to claim 3, wherein
said plurality of job execution units operate on a plurality of virtual servers built within one server having said memory area, and
sending said job identification information and said job execution information in said memory area to said job execution unit of a receiving party by memory copy within said server.

5. A non-transient computer-readable recording medium recording thereon a program which makes a computer function as:
a plurality of job execution units that carry out jobs;
a job management information memory unit that stores job identification information, identification information on said job execution unit that executes said job, job execution information and job continuing execution priority for each said job in a correlating manner; and
a job continuation management unit that refers to said job management information memory unit when a failure occurs in one of said job execution units, and, about records having identification information of said job execution unit identical with identification information of said job execution unit of failure origin, sends said job identification information and said job execution information to one of said job execution units except for a job execution unit of said failure origin sequentially in an order starting from a job having highest said job continuing execution priority to lowest, and making said job execution unit of a receiving party perform continuation execution of said job;
wherein:
said job management information memory unit stores a specific time to carry out said job and exceptional timing continuing execution priority to be applied as said continuing execution priority of said job limited to said specific time in a correlating manner; and
when a record with information of said specific time that matches current date and time information of a system, exists in said job management information memory unit, said job continuation management unit changes said continuation execution priority in said record to said exceptional timing continuing execution priority.

6. The computer-readable recording medium according to claim 5, recording thereon said program which makes said computer function as:
said job continuation management unit sends said job identification information and said job execution information in said job management information memory unit to said job execution unit of a receiving party by memory copy within said server.

7. A job continuation management apparatus, comprising:
a plurality of job execution means for carrying out jobs;
a job management information memory means for storing job identification information, identification information on said job execution means that executes said job, job execution information and job continuing execution priority for each said job in a correlating manner; and
a job continuation management means for referring to said job management information memory means when a failure occurs in one of said job execution means, and, about records having identification information of said job execution means identical with identification information of said job execution means of failure origin, sending said job identification information and said job execution information to one of said job execution means except for a job execution means of said failure origin sequentially in an order starting from a job having highest said job continuing execution priority to lowest, and making said job execution means of a receiving party perform continuation execution of said job;
wherein:
said job management information memory unit stores a specific time to carry out said job and exceptional timing continuing execution priority to be applied as said continuing execution priority of said job limited to said specific time in a correlating manner; and
when a record, with information of said specific time that matches current date and time information of a system, exists in said job management information memory unit, said job continuation management unit changes said continuation execution priority in said record to said exceptional timing continuing execution priority.

* * * * *